United States Patent
Byers et al.

(10) Patent No.: US 8,336,061 B2
(45) Date of Patent: *Dec. 18, 2012

(54) DRIVER CONFIGURATION

(75) Inventors: Jeff Byers, San Diego, CA (US); Jing Huang, San Diego, CA (US); Khosrow Panah, Anaheim, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1275 days.

This patent is subject to a terminal disclaimer.

(21) Appl. No.: 12/107,721

(22) Filed: Apr. 22, 2008

(65) Prior Publication Data

US 2008/0201727 A1    Aug. 21, 2008

Related U.S. Application Data

(63) Continuation of application No. 10/769,404, filed on Jan. 30, 2004, now Pat. No. 7,461,141.

(51) Int. Cl.
*G06F 9/54* (2006.01)

(52) U.S. Cl. ........ 719/327; 709/220; 709/221; 709/222; 719/321; 719/322; 719/324; 719/325

(58) Field of Classification Search .......... 709/220–222; 719/325, 324, 327
See application file for complete search history.

(56) References Cited

U.S. PATENT DOCUMENTS

| | | | |
|---|---|---|---|
| 6,959,343 B1 | 10/2005 | Brown | |
| 7,222,349 B1 | 5/2007 | Krinke et al. | |
| 7,231,550 B1 * | 6/2007 | McGuire et al. | 714/26 |
| 7,272,674 B1 | 9/2007 | Nandi et al. | |
| 7,274,659 B2 | 9/2007 | Hospodor | |
| 7,307,948 B2 * | 12/2007 | Infante et al. | 370/225 |
| 7,340,640 B1 * | 3/2008 | Karr et al. | 714/6.23 |
| 7,461,141 B2 * | 12/2008 | Byers et al. | 709/221 |
| 7,688,803 B1 * | 3/2010 | Young et al. | 370/352 |
| 7,689,803 B2 * | 3/2010 | Karr et al. | 711/203 |
| 2002/0161596 A1 * | 10/2002 | Johnson et al. | 705/1 |
| 2004/0054776 A1 | 3/2004 | Klotz et al. | |
| 2004/0064461 A1 * | 4/2004 | Pooni et al. | 707/100 |
| 2004/0064828 A1 * | 4/2004 | Cox | 719/327 |

* cited by examiner

*Primary Examiner* — Carl Colin
*Assistant Examiner* — Mohammad Siddiqi
(74) *Attorney, Agent, or Firm* — Kenneth Vu; James T. Hagler

(57) ABSTRACT

A method and apparatus for performing driver configuration operations without a system reboot is disclosed. In one embodiment, a network server's adapter driver receives a request to change a configuration of a selected instance of a plurality of instances. In response, the adapter driver may then determine if there is data flow through the selected instance. If there is no data flow through the selected instance, the method includes blocking subsequent data flow and subsequent information requests issued to the adapter driver. The selected instance may then be reinitializing without rebooting the server.

15 Claims, 5 Drawing Sheets

DRIVER CONFIGURATION

RELATED APPLICATIONS

This application is a Continuation of a prior filed application entitled, SYSTEM AND METHOD FOR PERFORMING DRIVER CONFIGURATION OPERATIONS WITHOUT A SYSTEM REBOOT, invented by Byers et al., Ser. No. 10/769,404, filed Jan. 30, 2004, which issued as U.S. Pat. No. 7,461,141, which is incorporated herein by reference.

BACKGROUND OF THE INVENTION

1. Field of the Invention

The present invention relates in general to data networks, and more particularly, to systems and methods for performing driver configuration operations without a system reboot.

2. Background Information

IT managers are under continuous pressure to maximize the performance from their storage systems, networks and servers. It is often possible to increase overall performance (data throughput and server resource utilization) on a storage area network by properly configuring and tuning certain system settings and parameters. For example, network adapter driver parameters that affect how data I/Os are processed can be configured and tuned based on a variety of factors. However, this method of performance tuning heretofore has required the IT manager to reboot the server. Moreover, other network adapter driver operations (e.g., dynamic target and LUN reconfiguration, driver parameter updates, unloading/reloading of drivers, etc.) also require time-consuming server rebooting.

When network adapter drivers support unloading, it is possible to effect the configuration changes by unloading and reloading the driver module. However, to be able to unload the driver module, all I/O instances of the driver must first be stopped. In servers equipped with multiple network adapter drivers, it may be difficult or impossible to idle all driver instances necessary to unload the driver. Moreover, obtaining clearance to reboot a production server can also be difficult, and often entails waiting for an infrequently occurring maintenance window before
the needed configuration changes can be made. Server reboots can consume more than two-and-a-half weeks of downtime annually.

As such, there is a need in the art for an improved system and method for dynamically reconfiguring storage assets and loading/unloading drivers without having to perform a server reboot.

SUMMARY OF THE INVENTION

Systems and methods for performing driver configuration operations without a system reboot are disclosed. In one embodiment, a method includes executing an adapter driver on a server that is coupled to a network, where the server is coupled to the network using a network adapter, and the adapter driver has a plurality of instances corresponding to a plurality of adapter ports of the network adapter. The method further includes receiving a request to change a configuration of a selected instance of the plurality of instances, and determining if there is data flow through the selected instance. If there is no data flow through the selected instance, the method also includes blocking all subsequent data flow through the selected instance, blocking subsequent information requests to the adapter driver relating to the selected instance, and reinitializing the selected instance without rebooting the server.

Other embodiments are disclosed and claimed herein.

DETAILED DESCRIPTION

Figure 1:
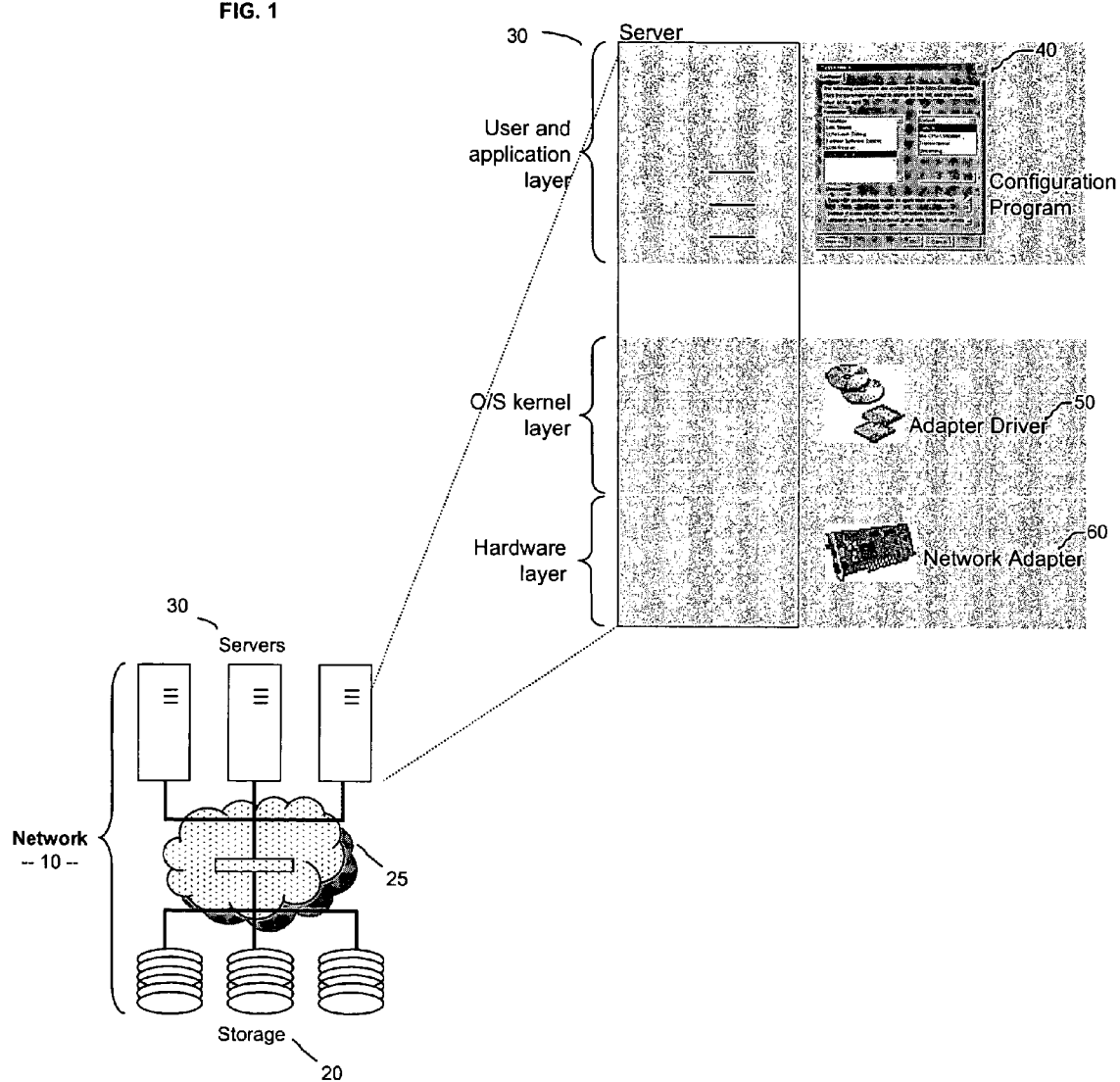
FIG. 1 depicts a simplified system-level diagram of one or more aspects of the invention, according to one or more embodiments.

One aspect of the invention is to provide an improved system and method for performing driver parameter operations without a system reboot. In one embodiment, the dynamic parameter update feature allows driver configuration changes to be made one driver instance at a time and thus only requires a single instance to be idled for the changes to be made. While in one embodiment the driver is a network host bus adapter (HBA) driver, it should be appreciated that the principles of the invention may be applied to other drivers.

It should further be appreciated that the HBA may have multiple network adapter ports, and that a networked system may have multiple HBAs installed. Moreover, in one embodiment there may be a single HBA driver installed and loaded for all adapter ports of a particular HBA make/model. References to each of these HBA adapter ports managed by the driver are referred to as "driver instances."

Another aspect of the invention is to enable the HBA driver to be loaded and unloaded without having to reboot the server, thus enabling the driver to be upgraded without performing a server reboot. In another embodiment, driver parameter may be modified and take effect immediately without performing a server reboot. In yet another embodiment, new devices may be added to the OS without the need to perform a server reboot.

The aforementioned embodiments may utilize a driver management application to convey new driver configuration information to the HBA driver instance. This new configuration information may then be used to update the HBA's driver property space. In one embodiment, this updating is done without requiring a server reboot. To do so, the driver management application may first verify that no I/O is flowing through the particular driver instance, and may then block all subsequent I/O requests to the driver instance. Thereafter, the driver management application performs a single instance reinitialization sequence for the adapter driver in question, according to one embodiment.

In one embodiment, the HBA is coupled to a network, where the network is a storage area network (SAN) and the HBA is a Fibre Channel (FC) adapter with PCI-X connectivity. It should of course equally be appreciated that the invention may be applied to other networking protocols, such as Ethernet, IP, iSCSI, TOE and Infiniband.

In accordance with the practices of persons skilled in the art of computer programming, the invention is described below with reference to symbolic representations of operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations such as in system memory, as well as other processing of signals. The memory locations where data bits are maintained are physical locations that have particular electrical, magnetic, optical, or organic properties corresponding to the data bits. Thus, the term "server" is understood to include any electronic device that contains a processor, such as a central processing unit.

When implemented in software, the elements of the invention are essentially the code segments to perform the necessary tasks. The program or code segments can be stored in a processor-readable medium or transmitted by a computer data signal embodied in a carrier wave over a transmission medium or communication link. The "processor-readable medium" may include any medium that can store or transfer information. Examples of the processor-readable medium includes an electronic circuit, a semiconductor memory device, a ROM, a flash memory (or other non-volatile memory), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Referring now to FIG. 1, depicted is one embodiment of an exemplary system comprised of a network 10. While in one embodiment, network 10 is a storage area network (SAN), it should be appreciated that it may have numerous other configurations. As shown, storage 20 is accessible by servers 30 over network connection 25. It should be appreciated that storage 20 may be any form of non-volatile memory suitable for use in a SAN or any other network. Similarly, servers 30 may be one or more of any server suitable for operating a SAN (or other network), including but not limited to Microsoft Windows 2000 Advanced Server™, Windows Server 2003 Enterprise Edition 32-bit™, Windows Server 2003 Enterprise Edition 64-bit™, Solaris 2.6™, Solaris 7™, Solaris 8™, Solaris 9™, Linux™, etc.

As shown in the embodiment of FIG. 1, servers 30 include a hardware layer, an operating system (OS) kernel layer and a user/application layer. The hardware layer is shown as including a network adapter 60 which may operate to couple servers 30 to the rest of network 10, which in the embodiment of FIG. 1 occurs via network connection 25. For example, network 10 may be a fibre channel (FC)-based network that uses network adapter 60 to connect to a PCI/PCI-X bus. Numerous other connection configurations may also be possible using network adapter 60. The OS kernel layer includes an adapter driver 50 which is the connectivity software used by server 30 to recognize and operate network adapter 60.

Continuing to refer to FIG. 1, server 30 is shown as further including a user/application layer comprised of configuration program 40 (depicted as a GUI in FIG. 1). In one embodiment, users interact with one or more GUIs of the configuration program to select from a list of possible application environments. Once selected, configuration program 40 maps the named value for the application environment to the adapter parameters. It should be appreciated that configuration program 40 may be a separate program or may be part of the software which comprises adapter driver 50. Configuration program 40 may provide the user with options for configuring one or more adapter parameters of adapter driver 50.

Figure 2:
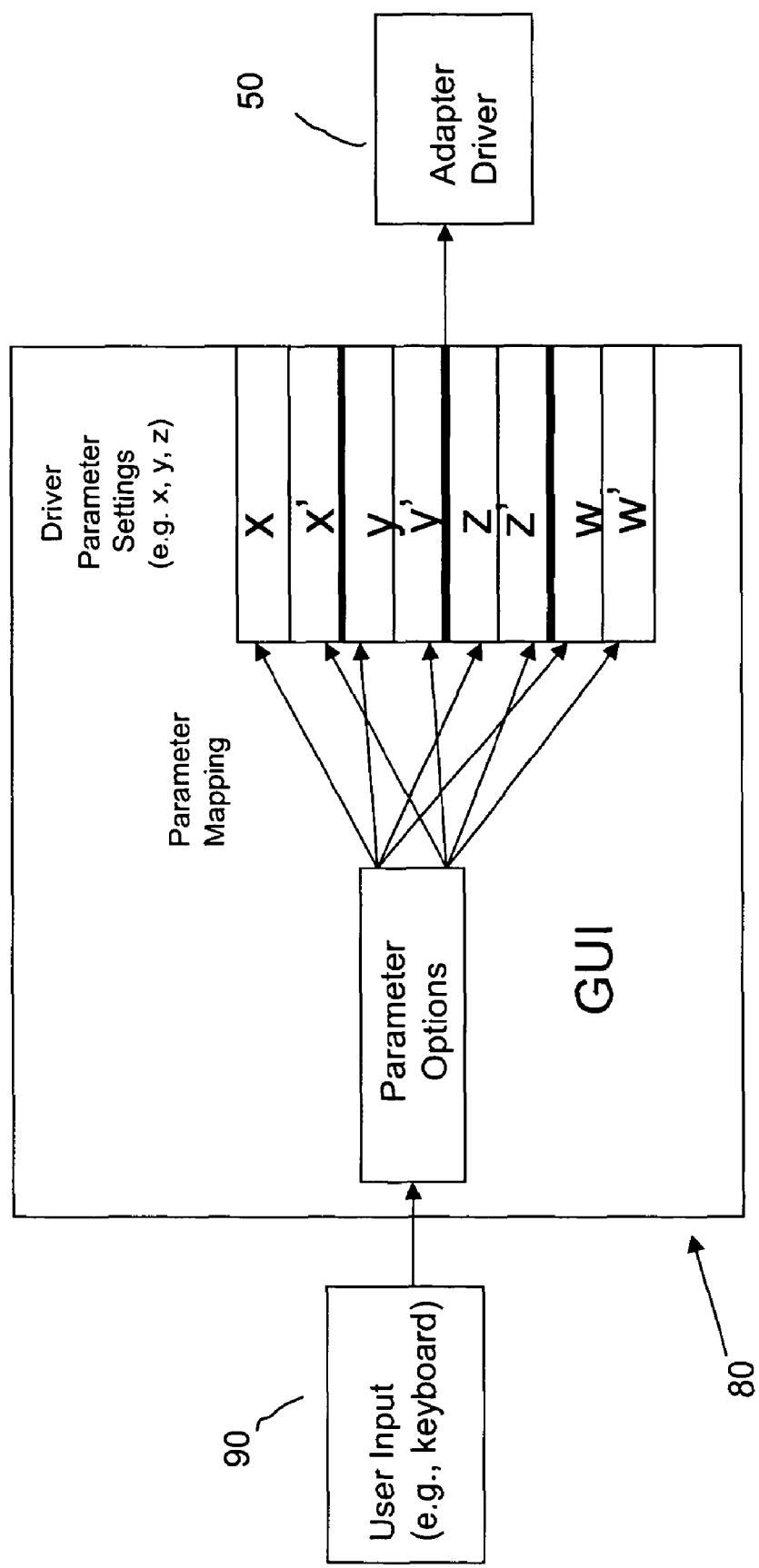
FIG. 2 depicts one embodiment of the GUI of FIG. 1.

Referring now to FIG. 2, depicted is one embodiment of a GUI 80 of configuration program 40. In this embodiment, GUI 80 is used to present a user with parameter options. By way of example, such parameter configuration options may include Port Topology, Port Link Speed, Target Failover Delay, I/O Throttle, and Target Device Mapping/Zoning settings. In one embodiment, user input 90 is used to select from among the available parameter configuration options. Once the user selection has been made, configuration program 40 maps the predetermined parameters for the selected parameter option to the driver parameter settings (e.g., x, y, z). These values are then provided to adapter driver 50 to configure the network adapter 60 (not shown).

Figure 3A:
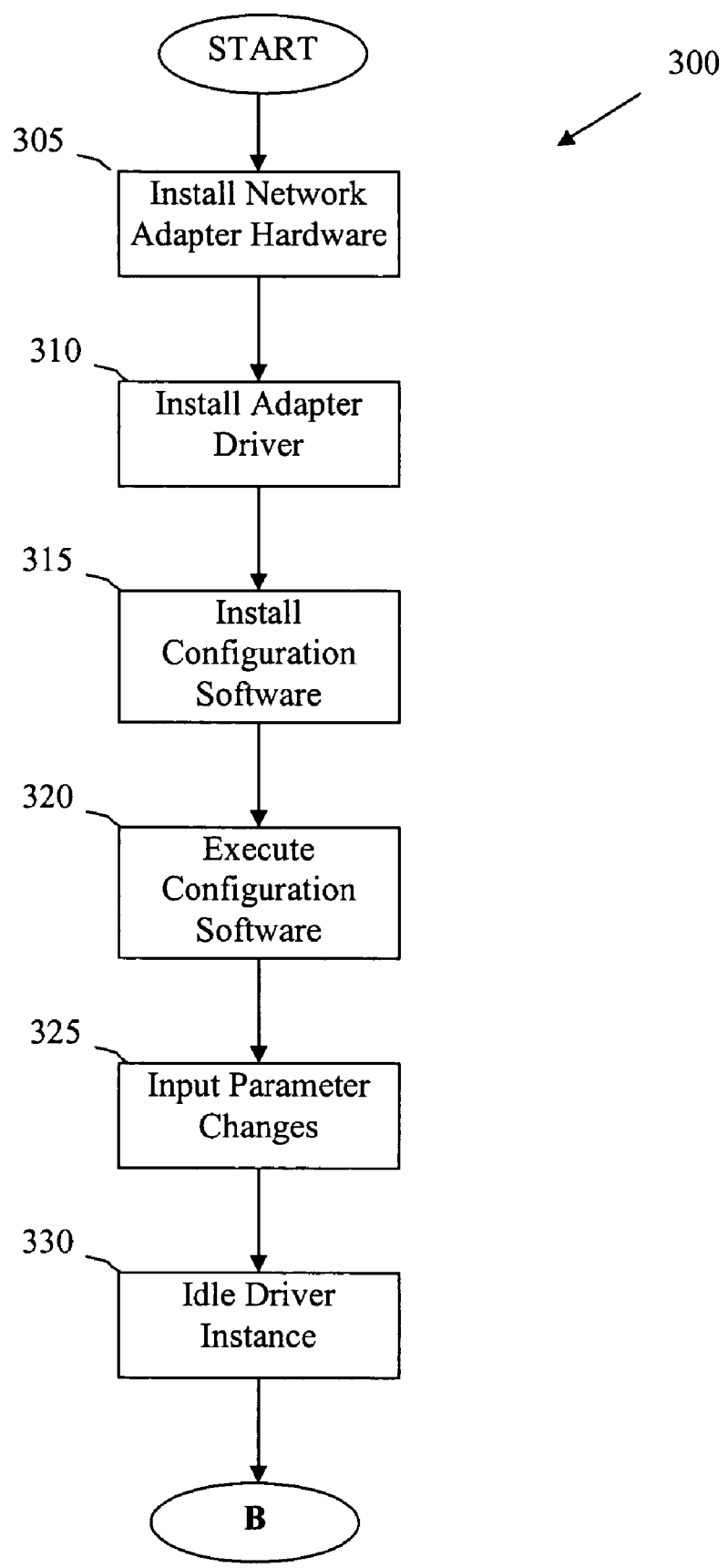
FIGS. 3A-3C depict one or more embodiments of a process for performing the driver configuration operations of the present invention.

Referring now to FIG. 3, depicted is one embodiment of a process 300 for setting up a server-based networking system which may implement one or more aspects of the invention. Process 300 begins at block 305 with a user installing the network adapter 60 on one of servers 30. In one embodiment, the server 30 is powered down, an access panel removed and the network adapter 60 inserted into an available slot (e.g., PCI-X slot). Thereafter, at block 310, adapter driver 50 may be installed on the server 30. In one embodiment, the operating system running on the server 30 may detect the newly installed hardware automatically, and automatically prompt a user to identify the location of the adapter driver 50. Regardless of whether the operating system assists with the adapter driver 50 installation process, process 300 will continue to block 315, where the configuration program 40 may then be installed by the user. This may proceed by having the user insert a computer-readable medium (e.g., diskette, CD, etc.), or by downloading the configuration program 40 to the server 30 via a network connection (e.g., via the Internet). As mentioned previously, it should further be appreciated that the configuration program 40 may simply be integrated into the software which comprises the adapter driver 50.

Once installed, a user may then execute the configuration program 40 to begin the adapter driver 50 configuration process (block 320). While it should be appreciated that the configuration program 40 may perform other tasks and include other functionality, a user may interact with the configuration program 40 via one or more GUIs, one of which may be the GUI previously referred to in FIG. 1. Once the user has navigated the configuration program 40 to access a list of available customizable parameters, at block 325 the user may then modify one or more of the adapter driver parameters. However, in one embodiment these changes are not implemented until the adapter driver 50 instance is idled so as not to disrupt I/O flow. To that end, the user may idle the driver instance to which the configuration changes were made at block 330. While in one embodiment, a user may have to manually terminate an application generating I/O through the driver instance, the adapter driver 50 can protect system integrity by preventing parameter modifications while I/O is flowing.

Figure 3B:
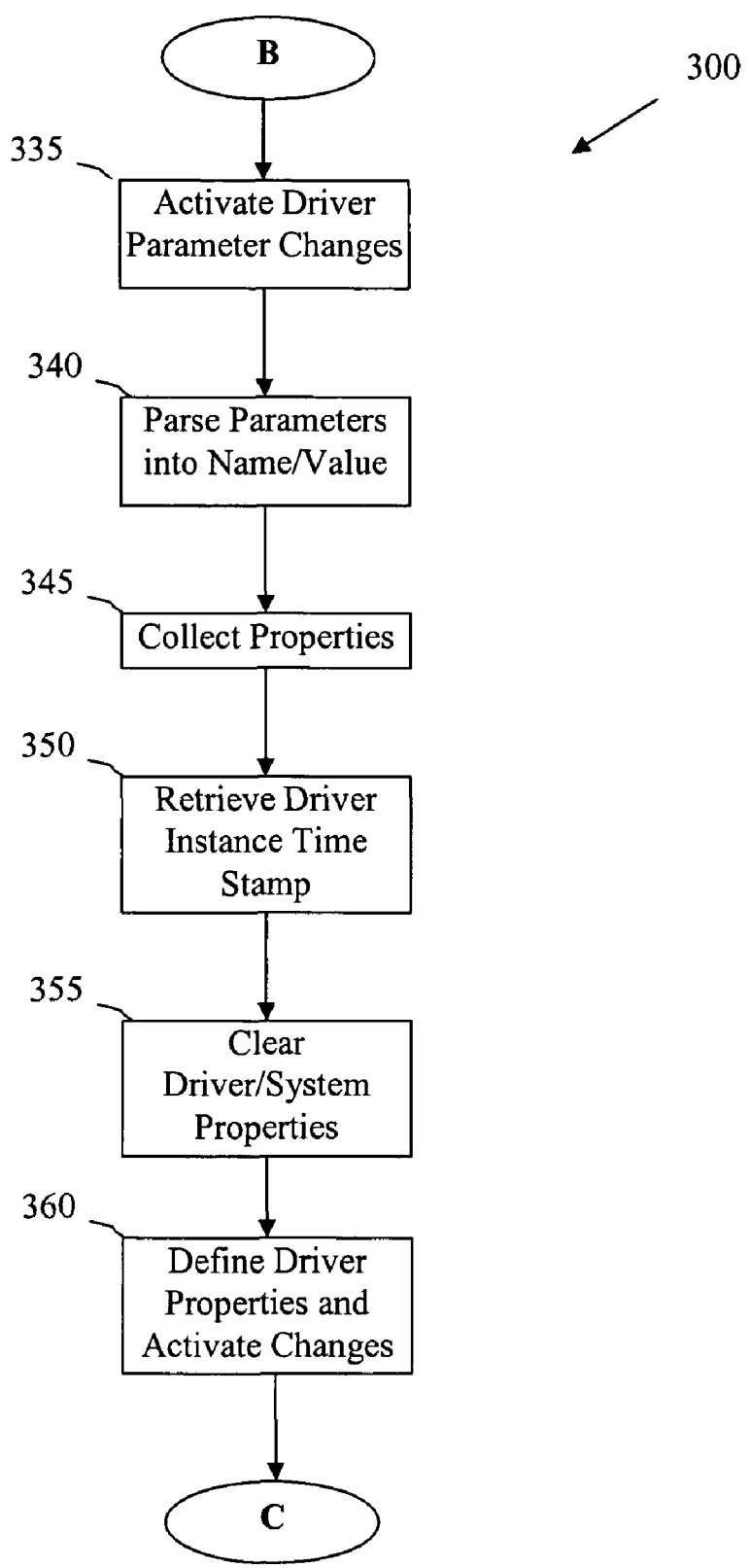

Referring now to FIG. 3B, process 300 continues with block 335. Once the adapter driver 50 instance is idled, a driver management application (e.g., configuration program 40, command line utility, etc.) may be used to activate the driver configuration changes. To that end, at block 335 a user may request (e.g., via GUI 80) that the driver parameter changes be activated.

Thereafter, at block 340, the invoked driver management application (which in one embodiment is configuration program 40) may parse the parameters in the configuration file of the selected driver into a list of name/value pairs. As will be described below, these name/value pairs are used as the new set of driver parameters that are to be activated, according to one embodiment.

Continuing to refer to FIG. 3B, the driver management application collects certain properties from the system. In particular, the driver instance configuration properties defined at the time the adapter driver 50 was last loaded (or system rebooted) may be collected from the operating system at block 345. To do so, the invoked driver management application may parse a "System Software Properties" section of the OS (e.g., Solaris 'prtconf' output) to collect the parameter names that were previously defined. In one embodiment, adapter driver 50 maintains default settings for any driver parameter that is not explicitly set in the configuration file. The purpose of collecting the "System Software Properties" parameters (those that were defined at the time the driver was loaded) at block 345 is to be able to later undefine them (see below—block 355). This may be necessary where, for example, a parameter that was explicitly defined in the configuration file at driver load time is now no longer defined, and needs to use the implicit default value.

Process 300 continues with block 350, where an epoch date/time stamp that indicates the last time the instance was initialized may be retrieved from the adapter driver 50. In one embodiment, this may be done via a function call to the adapter driver 50 requesting information (e.g., HBA driver management 'ioctl' function). As will be discussed in more detail below, this time stamp can be used to determine whether the dynamic parameter update was successful or not.

At this point in process 300, driver and system properties may be cleared/undefined at block 355. For example, in one embodiment the driver management application, via a function call to the adapter driver 50 (e.g., HBA driver management 'ioctl' function), may request the adapter driver 50 clear the instance's driver properties. Since the 'System Software Properties' are indelible and can only be set by the operating system when the adapter driver 50 is loaded or system rebooted, the driver management application may request that the adapter driver 50 explicitly "undefined" all of the instance's "System Software Properties." This has the effect of erasing the load time driver configuration properties by assigning overriding value-less driver properties of the same name. In one embodiment, performing this 'undefining' operation may be prudent since the configuration name/value pairs that were defined at driver load time may no longer be defined in the new configuration.

Continuing to refer to FIG. 3B, process 300 may then continue with block 360 where driver properties may be newly defined for all of the name/value pairs generated from the parsing of the new driver configuration file (see above—block 340). In one embodiment, this may be done by the driver management application using a driver function call operation. It should be appreciated that many of these newly defined property names will be the same as those already defined as the system software properties and undefined as driver properties. In one embodiment, when the same property is set multiple times, the last property definition takes precedence. Once the driver parameters have been defined, the new parameter changes may be activated (as was previously requested at block 335). In one embodiment, one of the parameters is a time value that the adapter driver 50 is to delay before initiating the driver instance re-initialization. The new parameter changes may be activated using an "activate" ioctl (e.g., a function call issued to the adapter driver 50 by the driver management application).

Figure 3C:
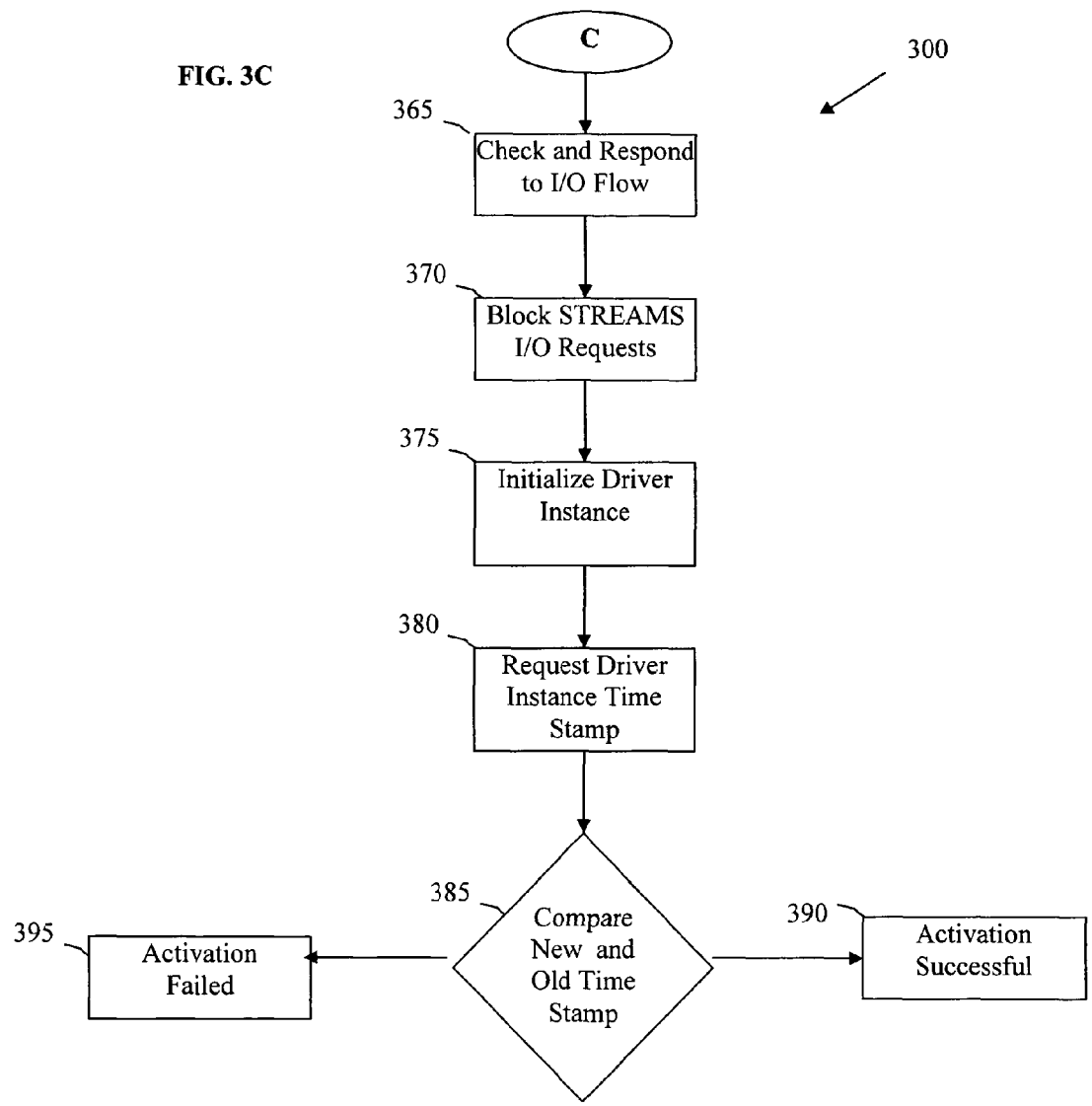

Referring now to FIG. 3C, process 300 continues with block 365 where the adapter driver 50 performs a check to make sure that the driver instance has no I/O flowing through it and to prevent new I/O from being initiated. If this check indicates idle I/O conditions, then the driver instance returns a 'success' response to the ioctl "activate" request. In addition, a delay parameter indicating how long the driver management application should wait before attempting to access the adapter driver 50 again may also be provided.

Process 300 continues with block 370 where the adapter driver 50 checks that the driver management application (e.g., management ioctl) has exited and blocks all I/O requests from the driver management application (e.g., STREAMS I/O). Since the driver management application is checking for idle conditions by submitting requests to the adapter driver 50, in order to achieve a true I/O idle condition the adapter driver 50 must tell the driver management application to stop asking for information. In one embodiment, if the adapter driver 50 determines that STREAMS I/O is not idle (e.g., the driver management application is asking for information), then I/O is unblocked and the request is rejected. If, on the other hand, STREAMS I/O is idle, then process 300 continues to block 375.

At block 375, the adapter driver 50 may then initialize the driver instance in question by tasking a thread to perform a per-instance detach( ) followed by attach( ) processing. Normally these driver entry points are called by the operating system. Thus, in this embodiment, the re-initialization of the adapter driver 50 is done on a per-instance basis and not directed by the operating system.

After the adapter driver 50 has been re-initialized, the driver management application again requests the driver instance date/time stamp indicating the last time the instance was initialized (block 380). In one embodiment, this date/time stamp may be requested only after a processing delay (if any) previously indicated by the driver has lapsed. Once this date/time stamp is received, at block 385 it may be compared to the previously registered date/time stamp from block 350 of FIG. 3B. If the date/time stamp of block 380 is newer than the date/time stamp of block 350, then the driver activation was successful (block 390). If, on the other hand, it is not, then the driver activation has failed (block 395).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A system comprising:
 a server coupled to a network;
 an operating system executing on the server;
 a network adapter coupling the server to the network, the network adapter having a plurality of adapter ports; and
 an adapter driver executing on the server, the adapter driver having a plurality of instances corresponding to the plurality of adapter ports, wherein said adapter driver is configured to perform operations in response to a configuration change request for a first instance associated with a first network adapter port comprising:
 reinitializing just the first instance with new configuration information;
 retrieving a previous initialization time stamp for the first instance indicating the last time the first instance was initialized;
 requesting a new initialization time stamp for the first instance subsequent to reinitializing the first instance;
 comparing the new initialization time stamp to the previous initialization time stamp; and
 indicating that the first instance configuration change is successful if the new initialization time stamp is dated later than said previous initialization time stamp.

2. The system of claim 1 wherein the adapter driver idles the first instance and activates configuration changes to the first instance.

3. The system of claim 2 wherein the adapter driver idles the first instance by determining if there is data flow through the first instance, and if not, blocking all subsequent data flow and all subsequent information requests.

4. The system of claim 2 wherein the adapter driver activates configuration changes to the first instance by reinitializing the first instance without rebooting the server.

5. The system of claim 2 wherein the adapter driver activates configuration changes to the first instance by parsing a first instance configuration file into a name/value parameter list.

6. The system of claim 5 wherein the adapter driver activates configuration changes to the first instance by clearing the first instance of old driver parameters, defining new driver parameters, and activating the new driver parameters.

7. The system of claim 1 wherein the adapter driver initiates a first instance configuration change in response to a request selected from a group consisting of a driver parameter update request, a driver unload/load request, and a new device detection request.

8. A method for performing a driver configuration, the method comprising:
   on a server coupled to a network through a network adapter, executing an adapter driver having a plurality of instances corresponding to a plurality of network adapter ports;
   requesting a configuration change for a first instance associated with a first network adapter port;
   reinitializing just the first instance with new configuration information;
   retrieving a previous initialization time stamp for the first instance indicating the last time the first instance was initialized;
   requesting a new initialization time stamp for the first instance subsequent to reinitializing the first instance;
   comparing the new initialization time stamp to the previous initialization time stamp; and
   indicating that the first instance configuration change is successful if the new initialization time stamp is dated later than said previous initialization time stamp.

9. The method of claim 8 wherein reinitializing just the first instance with new configuration information includes:
   idling the first instance; and,
   activating configuration changes to the first instance.

10. The method of claim 9 wherein idling the first instance includes:
    determining if there is data flow through the first instance; and,
    if not, blocking all subsequent data flow and all subsequent information requests.

11. The method of claim 9 wherein reinitializing just the first instance with new configuration information includes reinitializing the first instance without rebooting the server.

12. The method of claim 8 wherein reinitializing just the first instance with new configuration information includes parsing a first instance configuration file into a name/value parameter list.

13. The method of claim 12 wherein reinitializing just the first instance with new configuration information includes:
    clearing the first instance of old driver parameters;
    defining new driver parameters, and,
    activating the new driver parameters.

14. The method of claim 8 further comprising:
    initiating a first instance configuration change in response to a request selected from a group consisting of a driver parameter update request, a driver unload/load request, and a new hardware detection request.

15. A non-transitory computer-readable medium having stored thereon computer-executable instructions configured to cause a processor to perform operations comprising:
    receiving new configuration parameter options for a first adapter port; and,
    executing an adapter driver having a plurality of instances corresponding to a plurality of network adapter ports, the adapter driver activating the new configuration parameter options for a first instance associated with the first adapter port;
    reinitializing just the first instance with new configuration information;
    retrieving a previous initialization time stamp for the first instance indicating the last time the first instance was initialized;
    requesting a new initialization time stamp for the first instance subsequent to reinitializing the first instance;
    comparing the new initialization time stamp to the previous initialization time stamp; and
    indicating that the first instance configuration change is successful if the new initialization time stamp is dated later than said previous initialization time stamp.

* * * * *